(12) United States Patent
Choi et al.

(10) Patent No.: US 11,168,939 B2
(45) Date of Patent: Nov. 9, 2021

(54) DRYING SYSTEM

(71) Applicant: LG CHEM, LTD., Seoul (KR)

(72) Inventors: Jae Hoon Choi, Daejeon (KR); Won Chan Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 240 days.

(21) Appl. No.: 16/473,557

(22) PCT Filed: Dec. 21, 2017

(86) PCT No.: PCT/KR2017/015181
§ 371 (c)(1),
(2) Date: Jun. 25, 2019

(87) PCT Pub. No.: WO2018/124622
PCT Pub. Date: Jul. 5, 2018

(65) Prior Publication Data
US 2020/0141641 A1    May 7, 2020

(30) Foreign Application Priority Data
Dec. 26, 2016 (KR) .................... 10-2016-0178853

(51) Int. Cl.
*F26B 3/06* (2006.01)
*B65G 43/08* (2006.01)
(Continued)

(52) U.S. Cl.
CPC ............. *F26B 3/06* (2013.01); *B65G 43/08* (2013.01); *F26B 17/04* (2013.01); *F26B 21/04* (2013.01); *F26B 25/002* (2013.01); *B65G 15/00* (2013.01)

(58) Field of Classification Search
CPC .......... F26B 3/06; F26B 17/04; F26B 25/002; F26B 21/04; B65G 43/08; B65G 15/00
(Continued)

(56) References Cited

U.S. PATENT DOCUMENTS 1,453,750 A * 5/1923 Christensen ............ F26B 17/14
34/174
2,330,922 A * 10/1943 Riegler ................. F26B 17/284
264/144
(Continued)

FOREIGN PATENT DOCUMENTS

CN        104204701 A      12/2014
EP        3240063 B1 *     9/2019 ........ H01M 10/6563
(Continued)

*Primary Examiner* — Stephen M Gravini
(74) *Attorney, Agent, or Firm* — Dentons US LLP

(57) ABSTRACT

The present invention relates to a drying system, and according to one aspect of the present invention, there is provided a drying system comprising a transfer conveyor for transporting particles, a particle dispersing device including a rotary member provided at one side of the transfer conveyor and having a rotation center, a drive part for rotating the rotary member and a particle supply part mounted on the rotary member having particles stored therein, and a heating part for drying the particles on the transfer conveyor in a transfer process, wherein the heating part comprises a heat exchanger and a blast fan, and is provided such that air discharged from the blast fan is supplied to the transfer conveyor after passing through the heat exchanger.

7 Claims, 3 Drawing Sheets

(51) Int. Cl.
  *F26B 17/04* (2006.01)
  *F26B 21/04* (2006.01)
  *F26B 25/00* (2006.01)
  *B65G 15/00* (2006.01)

(58) Field of Classification Search
  USPC .......................................................... 34/443
  See application file for complete search history.

(56) References Cited

U.S. PATENT DOCUMENTS

| | | | | |
|---|---|---|---|---|
| 3,130,961 | A * | 4/1964 | Verner | F26B 17/04 |
| | | | | 432/72 |
| 4,334,366 | A * | 6/1982 | Lockwood | F26B 7/00 |
| | | | | 34/164 |
| 4,784,878 | A * | 11/1988 | Haak | A23C 1/045 |
| | | | | 118/313 |
| 5,038,498 | A * | 8/1991 | Woolsey | F26B 17/08 |
| | | | | 34/225 |
| 5,909,943 | A * | 6/1999 | Poirier | F26B 25/002 |
| | | | | 34/172 |
| 8,176,655 | B2 * | 5/2012 | Gibson | F26B 3/12 |
| | | | | 34/558 |
| 9,238,215 | B2 * | 1/2016 | Weismantel | C08F 6/10 |
| 9,327,270 | B2 * | 5/2016 | Stueven | F26B 25/22 |
| 9,890,344 | B2 * | 2/2018 | Kim | F26B 21/02 |
| 10,005,064 | B2 * | 6/2018 | Grunewald | B65G 17/067 |
| 10,137,432 | B2 * | 11/2018 | Grunewald | B01J 20/3021 |
| 10,164,305 | B2 * | 12/2018 | Lee | H01M 50/20 |
| 10,408,538 | B2 * | 9/2019 | Tan | C02F 11/121 |
| 10,415,882 | B2 * | 9/2019 | O'Gary | F26B 9/063 |
| 2014/0114035 | A1 | 4/2014 | Nogi et al. | |
| 2014/0290251 | A1 | 10/2014 | Sugasawa et al. | |
| 2016/0279605 | A1 | 9/2016 | Grunewald et al. | |
| 2020/0141641 | A1 * | 5/2020 | Choi | F26B 3/06 |

FOREIGN PATENT DOCUMENTS

| | | | | |
|---|---|---|---|---|
| EP | 3561422 | A4 * | 1/2020 | ............ F26B 21/04 |
| GB | 1371392 | A * | 10/1974 | ................ F26B 9/08 |
| JP | 58-145493 | | 8/1983 | |
| JP | 2-152501 | | 6/1990 | |
| JP | 06-227619 | A | 8/1994 | |
| JP | 2005-331137 | A | 12/2005 | |
| JP | 6474403 | B2 * | 2/2019 | ............ B65G 69/20 |
| KR | 10-0389177 | B1 | 6/2003 | |
| KR | 10-2012-0048703 | A | 5/2012 | |
| KR | 10-1321527 | B1 | 10/2013 | |
| KR | 10-2013-0126167 | A | 11/2013 | |
| KR | 10-1473553 | B1 | 12/2014 | |
| WO | WO-2015074966 | A1 * | 5/2015 | ........... B01J 20/261 |
| WO | 2016/180597 | A1 | 11/2016 | |

* cited by examiner

[Figure 1]
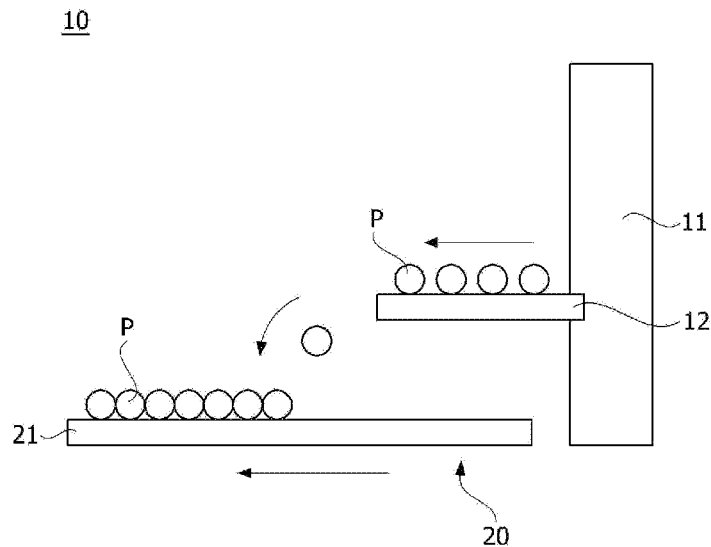
[Figure 2]
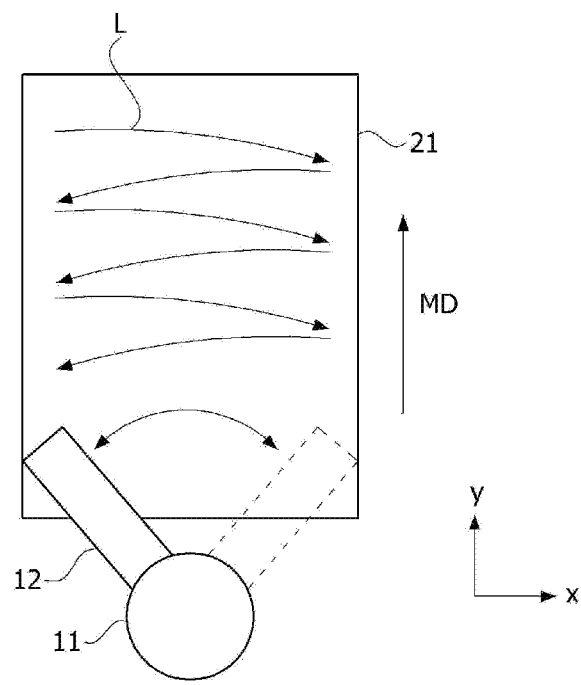

[Figure 3]
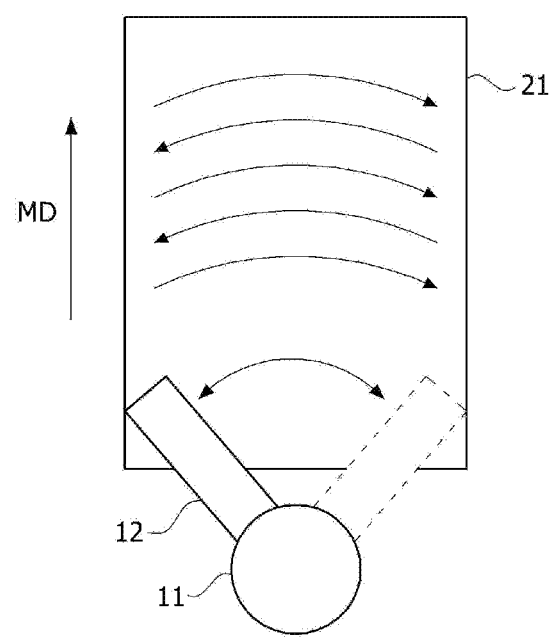

[Figure 4]
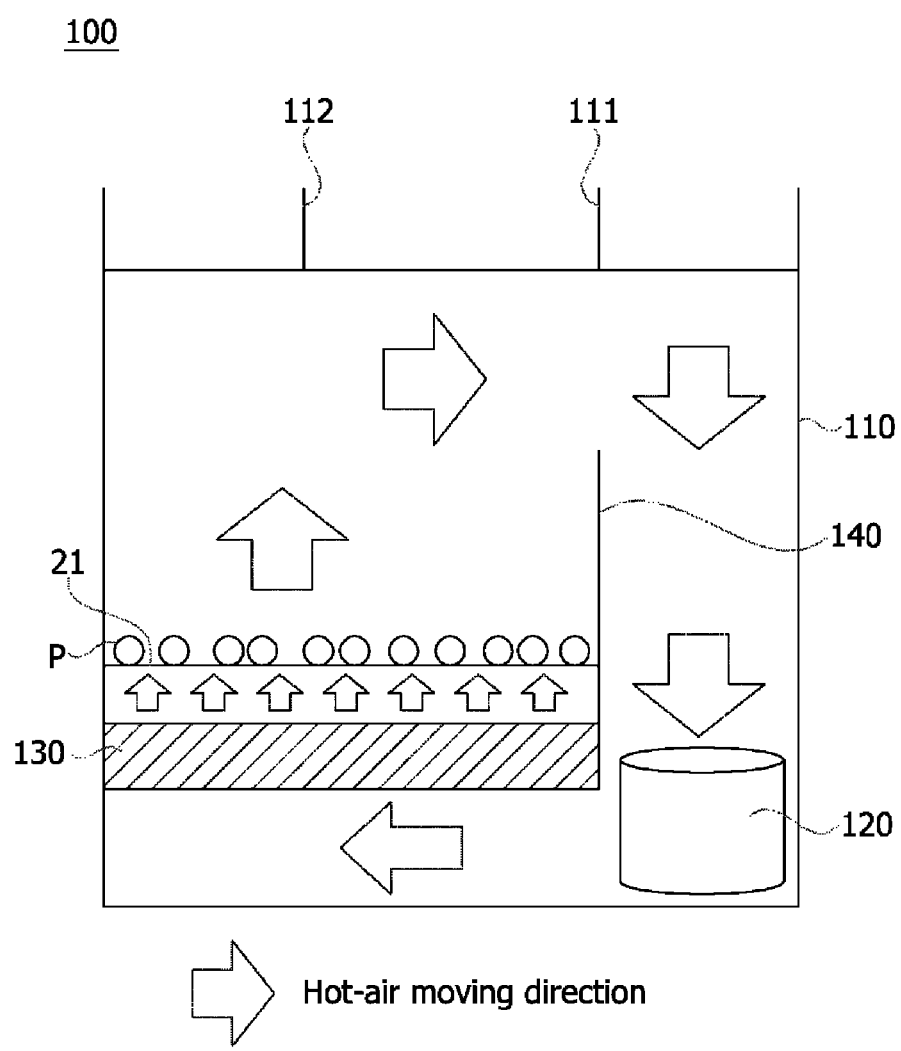

DRYING SYSTEM

The present application is a National Phase entry pursuant to 35 U.S.C. § 371 of International Application No. PCT/KR2017/015181 filed Dec. 21, 2017, and claims priority to and the benefit of Korean Patent Application No. 10-2016-0178853 filed on Dec. 26, 2016, the disclosures of which are incorporated herein by reference in their entirety.

FIELD

The present invention relates to a drying system.

BACKGROUND

A drying process of a particle-based polymer performed through a drying system is carried out through hot air or the like after uniformly dispersing particles on a transfer conveyor. At this time, a spreading oscillator is used to disperse and load the particles evenly on the transfer conveyor along the width direction of the conveyor.

FIGS. 1 and 2 are schematic diagrams for explaining one operating state of a particle dispersing device (spreading oscillator) (10). The oscillator (10) comprises a rotating shaft (11) and a particle supply part (12) mounted on the rotating shaft (11). At this time, the particle supply part (12) is provided to reciprocate within a predetermined angular range about the rotating shaft (11). In such a structure, a method is used, in which the particle supply part (12) rotationally reciprocates, drawing an arc on the basis of the rotating shaft (11), to spread particles (P) to be dried on a belt (21) of a transfer conveyor (20).

Furthermore, referring to FIG. 2, repetition times that the particle supply part (12) passes vary for each position along the width direction (x-axis direction) and the conveying direction (y-axis direction) of the belt (21), and thus the particles (P) are unevenly accumulated as a whole.

For convenience of explanation, it is assumed that the transfer conveyor (20) transports the belt (21) at a rate of 3 cm/s and the oscillator (10) rotationally reciprocates and returns to the initial position every 10 seconds (one-way movement is 5 seconds). Referring to the particle application locus (L) in FIG. 2, particles are sprayed on both sides of the belt (21) every 10 seconds (during this time, the belt is advanced 30 cm). However, particles are sprayed every 5 seconds onto the central portion of the belt (21) (at this time, the belt is advanced 15 cm). In this way, since particles are sprayed while the oscillator (10) reciprocates, it can be confirmed that the interval or time at which the particles are spread at each position is different. The symbol MD (moving direction) indicates the conveying direction of the transfer conveyor.

Also, if the particles are unevenly dispersed on the belt (21), partially dried particles are generated due to pressure difference or the like upon the drying process, whereby control of the overall physical properties of the product is difficult. Therefore, it is important to uniformly disperse the particles on the transfer conveyor.

Furthermore, as a heating part for drying particles transported through the transfer conveyor, a hot-air dryer is used, where the hot air passing through a heat exchanger passes to a distribution plate and is supplied toward the transfer conveyor for drying the particles. The distribution plate functions to distribute the hot air evenly along the width direction of the transfer conveyor. In addition, when the heat exchanger is further installed, a difference in pressure before/after passage of the heat exchanger occurs, which causes a decrease in the flow rate of hot air circulating in a drying chamber, so there are limitations on the addition of a heat exchanger. In addition, there are limitations on the addition of a heat exchanger depending on an installation space in the drying chamber.

SUMMARY

It is an object of the present invention to provide a drying system capable of uniformly dispersing particles on a transfer conveyor and having a uniform flow rate distribution across the width direction of the transfer conveyor with a wide heat transfer area.

To solve the above object, according to one aspect of the present invention, there is provided a drying system comprising a transfer conveyor for transporting particles, a particle dispersing device including a rotary member provided at one side of the transfer conveyor and having a rotation center, a drive part for rotating the rotary member and a particle supply part mounted on the rotary member having particles stored therein, and a heating part for drying the particles on the transfer conveyor in a transfer process, wherein the heating part comprises a heat exchanger and a blast fan, and is provided such that air discharged from the blast fan is supplied to the transfer conveyor after passing through the heat exchanger.

Also, the heat exchanger may be provided so that the air passing through the heat exchanger may be distributed across the width direction of the transfer conveyor.

Furthermore, the heat exchanger may be disposed below the transfer conveyor.

In addition, the heat exchanger may have a shape elongated along the width direction to correspond to the width of the transfer conveyor.

Also, the drying system may comprise a control part for controlling the transfer conveyor and the drive part.

Furthermore, when the particles are supplied to the transfer conveyor, the control part may control so that the particle supply part rotates with drawing an arc on the basis of the rotation center of the rotary member in a predetermined direction.

In addition, when the particle supply part is rotated, the control part may be provided so as to stop the transfer conveyor.

Also, when the rotation of the particle supply part is completed, the control part may operate the transfer conveyor such that the loaded particles are transported.

Furthermore, the control part may control so that the particle supply part rotationally reciprocates in different directions within a predetermined angle range on the basis of the rotation center.

In addition, the particle supply part may comprise a belt conveyor.

Also, the control part may control so that along the width direction of the transfer conveyor, the particles are loaded thicker on both side edges than the center portion.

As described above, the drying system related to at least one embodiment of the present invention has the following effects.

The particles can be uniformly dispersed on the transfer conveyor and a uniform flow rate distribution can be formed across the width direction of the transfer conveyor with a wide heat transfer area.

In addition, when the particles are loaded on the transfer conveyor in accordance with the rotation of the particle supply part, the transfer conveyor stops the transport, and when the rotation of the particle supply part is completed, the transfer conveyor is moved again, whereby the particles can be uniformly dispersed on the transfer conveyor to improve the drying efficiency.

BRIEF DESCRIPTION OF THE DRAWINGS

FIGS. 1 and 2 are schematic diagrams for explaining one operating state of a particle dispersing device.

FIG. 3 is a schematic diagram for explaining one operating state of a particle dispersing device constituting a drying system related to one embodiment of the present invention.

FIG. 4 is a schematic diagram showing a heating part constituting a drying system related to one embodiment of the present invention.

DETAILED DESCRIPTION

Hereinafter, a drying system according to one embodiment of the present invention will be described in detail with reference to the accompanying drawings.

In addition, the same or similar reference numerals are given to the same or corresponding components regardless of reference numerals, and redundant explanations will be omitted. For convenience of explanation, the size and shape of each constituent member as shown may be exaggerated or reduced.

FIG. 3 is a schematic diagram for explaining one operating state of a particle dispersing device constituting a drying system related to one embodiment of the present invention, and FIG. 4 is a schematic diagram showing a heating part (100) constituting a drying system related to one embodiment of the present invention.

The drying system related to one embodiment of the present invention comprises a transfer conveyor for transporting loaded particles (P), a particle dispersing device and a heating part (100) for drying the particles loaded on the transfer conveyor in a transfer process.

The particle dispersing device is provided at one side of the transfer conveyor and comprises a rotary member (11) having a rotation center (C), a drive part for rotating the rotary member (11), and a particle supply part (12) mounted on the rotary member (11) and having particles stored therein. When the particles (P) are loaded on the transfer conveyor through the particle dispersing device (10), the transfer conveyor transports the particles to the heating part (100).

Also, as the transfer conveyor, various types of conveyors may be used, and for example, the transfer conveyor may be a belt (21) conveyor.

For convenience of explanation, the transfer conveyor is described as an example of a belt conveyor, and in the drawing, the particles (P) are described as being loaded on the belt (21) and transported.

Referring to FIG. 4, the heating part (100) comprises a drying chamber (110) for providing a drying space. The drying chamber (110) is provided with an inlet (111) through which external air flows and an outlet (112) through which gases and foreign substances in the drying chamber (110) are discharged to the outside, respectively.

Also, the heating part (100) comprises a heat exchanger (130) and a blast fan (120) disposed in the drying chamber (110), respectively. Here, the heating part (100) is provided so that the air discharged from the blast fan (120) is supplied to the transfer conveyor after passing through the heat exchanger (130).

Furthermore, the heat exchanger (130) is provided so that the air passing through the heat exchanger (130) can be distributed across the width direction (the x-axis direction in FIG. 2) of the transfer conveyor. The heat exchanger (130) is also disposed below the transfer conveyor. In particular, the heat exchanger (130) is elongated along the width direction so as to correspond to the width of the transfer conveyor. Through this structure, a uniform flow distribution can be formed without using a conventional distribution plate, and a wide heat transfer area can be secured.

In addition, the heating part (100) comprises a partition wall (140) for separating the inflow side and the inflow side of the blower (120). That is, the air discharged from the blower (120) is only delivered to the heat exchanger (130) side, and the hot air passing through the heat exchanger (130) is supplied only to the belt (21), by the partition wall (140).

The particle dispersing device (10) comprises a rotary member (11) provided at one side of the transfer conveyor and having a rotation center. Also, the particle dispersing device comprises a drive part (not shown) for rotating the rotary member (11) and a particle supply part (12) mounted on the rotary member (11) and having the particles stored therein. The particle dispersing device comprises a control part (not shown) for controlling the transfer conveyor and the drive part.

Furthermore, the control part controls the heating part.

On the other hand, the drive part may comprise, for example, a motor shaft-connected to the rotary member (11). As long as the particle supply part (12) can drop particles onto the transfer conveyor by vibration or the like, the type is not limited, but for example, the particle supply part (12) may comprise a belt conveyor. Thus, the particles (P) settled on the belt can be applied on the belt (21) of the transfer conveyor in accordance with the operation of the particle supply part (12). In addition, the particles can be supplied to the particle supply part (12) through a hopper (not shown) where a large amount of particles are stored, or the like.

Referring to FIG. 3, when the particles are supplied to the transfer conveyor, the control part controls so that the particle supply part (12) is rotated with drawing an arc on the basis of the rotation center of the rotary member (11) in a predetermined direction (clockwise and/or counterclockwise).

The control part stops the transfer conveyor when the particle supply part (12) is rotated. Also, when the rotation of the particle supply part is completed, the control part operates the transfer conveyor such that the loaded particles are transported. A symbol MD denotes the conveying direction of the transfer conveyor. In addition, a reference numeral 21 denotes a belt of the transfer conveyor on which the particles are loaded.

Also, the control part controls so that the particle supply part (12) rotationally reciprocates in different directions (clockwise and counterclockwise) within a predetermined angular range on the basis of the rotation center. For example, the control part controls so that the particle supply part (12) rotates clockwise on the basis of the rotation center, and then controls so that the particle supply part (12) rotates counterclockwise on the basis of the rotation center. That is, when the reciprocating rotational movement is completed once, the particle supply part (12) returns to the initial position.

Furthermore, the particle supply part (12) may be positioned at the edge of the transfer conveyor (20) in the width direction after the rotation in one direction is completed. In addition, the width direction indicates a direction orthogonal to the conveying direction (MD).

Specifically, the control part stops the transfer conveyor upon rotating the particle supply part (12) in a first direction (clockwise direction). Also, when the rotation of the particle supply part (12) in the first direction is completed, the control part operates the transfer conveyor such that the loaded particles are transported.

Thereafter, the control part stops the transfer conveyor again upon rotating the particle supply part (12) in a second direction (counterclockwise direction) opposite to the first direction. Furthermore, when the rotation of the particle supply part (12) in the second direction is completed, the control part again operates the transfer conveyor (20) such that the loaded particles are transported.

In addition, the control part can control so that along the width direction of the transfer conveyor, the particles are loaded thicker on both side edges than the center portion. That is, when the particles are loaded on the transfer conveyor in the manner as above, the thickness of the particles loaded on both side edges along the width direction of the transfer conveyor may increase, but it has an effect capable of preventing lifting by strong hot air from the heating part.

The preferred examples of the present invention as described above are disclosed for illustrative purposes, which can be modified, changed and added within thought and scope of the present invention by those skilled in the art and it will be considered that such modification, change and addition fall within the following claims.

The drying system according to the present invention can uniformly disperse the particles on the transfer conveyor and can form a uniform flow distribution across the width direction of the transfer conveyor with a wide heat transfer area.

The invention claimed is:

1. A drying system comprising:
    a transfer conveyor for transporting particles having a width with a center portion and a direction along the width thereof;
    a particle dispersing device including a rotary member provided at one side of the transfer conveyor and having a rotation center, a drive part for rotating the rotary member and a particle supply part mounted on the rotary member having particles stored therein; and
    a heating part for drying the particles on the transfer conveyor in a transfer process, wherein the heating part comprises a heat exchanger and a blast fan, and is provided such that air discharged from the blast fan is supplied to the transfer conveyor after passing through the heat exchanger,
    a control part for controlling the transfer conveyor and the drive part, wherein upon supplying the particles to the transfer conveyor, the control part controls so that the particle supply part rotates along an arc about the rotation center of the rotary member in a predetermined direction, wherein when the particle supply part is rotated, the control part stops the transfer conveyor, and wherein the control part controls so that the particle supply part rotationally reciprocates in different directions within a predetermined angle range about the rotation center.

2. The drying system according to claim 1, wherein the heat exchanger is provided such that air passing through the heat exchanger can be distributed across the width direction of the transfer conveyor.

3. The drying system according to claim 1, wherein the heat exchanger is disposed below the transfer conveyor.

4. The drying system according to claim 3, wherein the heat exchanger is elongated along the width direction so as to correspond to the width of the transfer conveyor.

5. The drying system according to claim 1, wherein if the rotation of the particle supply part is completed, the control part operates the transfer conveyor such that the loaded particles are transported.

6. The drying system according to claim 1, wherein the particle supply part comprises a belt conveyor.

7. The drying system according to claim 1, wherein the control part controls so that along the width direction of the transfer conveyor, the particles are loaded thicker on both side edges than the center portion.

* * * * *